(12) United States Patent
Suteerawanit

(10) Patent No.: US 11,344,021 B1
(45) Date of Patent: May 31, 2022

(54) COCKROACH ELECTROCUTION DEVICE

(71) Applicant: Nick Suteerawanit, Los Angeles, CA (US)

(72) Inventor: Nick Suteerawanit, Los Angeles, CA (US)

(*) Notice: Subject to any disclaimer, the term of this patent is extended or adjusted under 35 U.S.C. 154(b) by 0 days.

(21) Appl. No.: 17/684,924

(22) Filed: Mar. 2, 2022

(51) Int. Cl.
  *A01M 1/02* (2006.01)
  *A01M 1/22* (2006.01)
  *A01M 1/10* (2006.01)

(52) U.S. Cl.
  CPC .............. *A01M 1/223* (2013.01); *A01M 1/02* (2013.01); *A01M 1/103* (2013.01)

(58) Field of Classification Search
  CPC .................................................... A01M 1/223
  See application file for complete search history.

(56) References Cited

U.S. PATENT DOCUMENTS

| | | | |
|---|---|---|---|
| 1,314,242 A | 8/1919 | Bjorge | |
| 2,307,163 A | 7/1941 | Shea | |
| 4,074,456 A * | 2/1978 | Tidwell | A01M 1/2011 |
| | | | 43/112 |
| 4,144,668 A * | 3/1979 | Darncharnjitt | A01M 1/04 |
| | | | 43/107 |
| 4,709,502 A * | 12/1987 | Bierman | A01M 1/223 |
| | | | 43/112 |
| 5,241,779 A | 9/1993 | Lee | |
| 5,878,526 A * | 3/1999 | Brigalia, Sr. | A01M 1/223 |
| | | | 43/112 |
| 6,925,749 B2 | 4/2005 | Wong | |
| 7,757,432 B2 | 7/2010 | Gunderman | |
| D907,167 S | 1/2021 | Luo | |
| 2020/0352151 A1 | 11/2020 | Plaunt | |

FOREIGN PATENT DOCUMENTS

WO   WO2020038080   8/2018

* cited by examiner

*Primary Examiner* — Richard G Davis
(74) *Attorney, Agent, or Firm* — Averill & Green; Kenneth L. Green

(57) ABSTRACT

A German cockroach trap provides bait, humidity, and temperature to attract German cockroaches into entries, electrocutes the German cockroaches upon entry into the trap, and stores dead cockroaches below the entries. Electrode bands form a closed ring on an interior surface and contact with two of the rings immediately kills the German cockroach which drops into a receiving dock below. A center electrode band may include holes for entry into the trap. A water reservoir in the bottom of the trap is heated to generate humid vapor. Heaters in the top of the trap are controlled to maintain temperature and a fan in the top of the trap draws ambient air into the trap to create a humid vapor flow out through the entries. Bait trays contain material further attracting the German cockroaches.

17 Claims, 2 Drawing Sheets

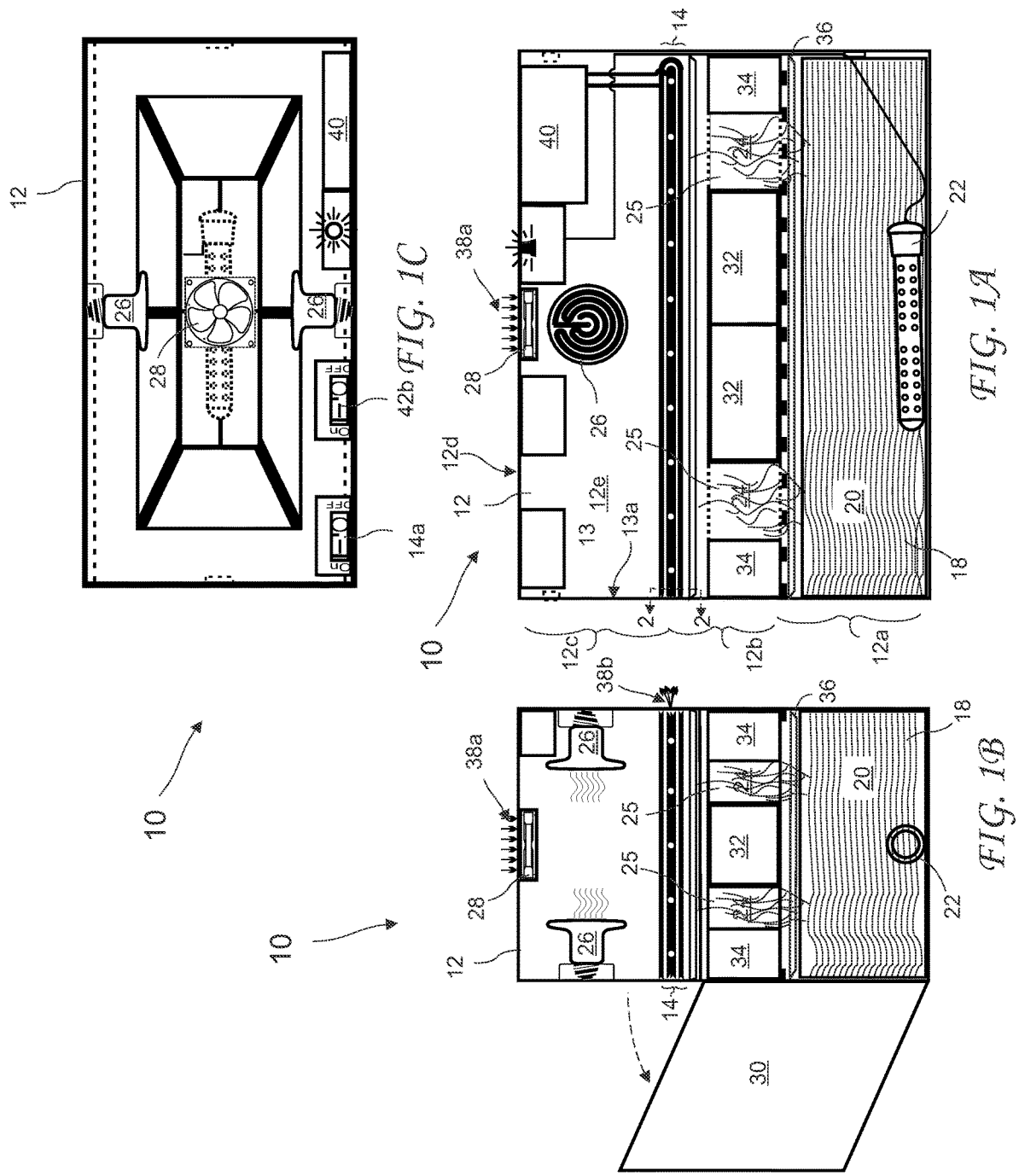

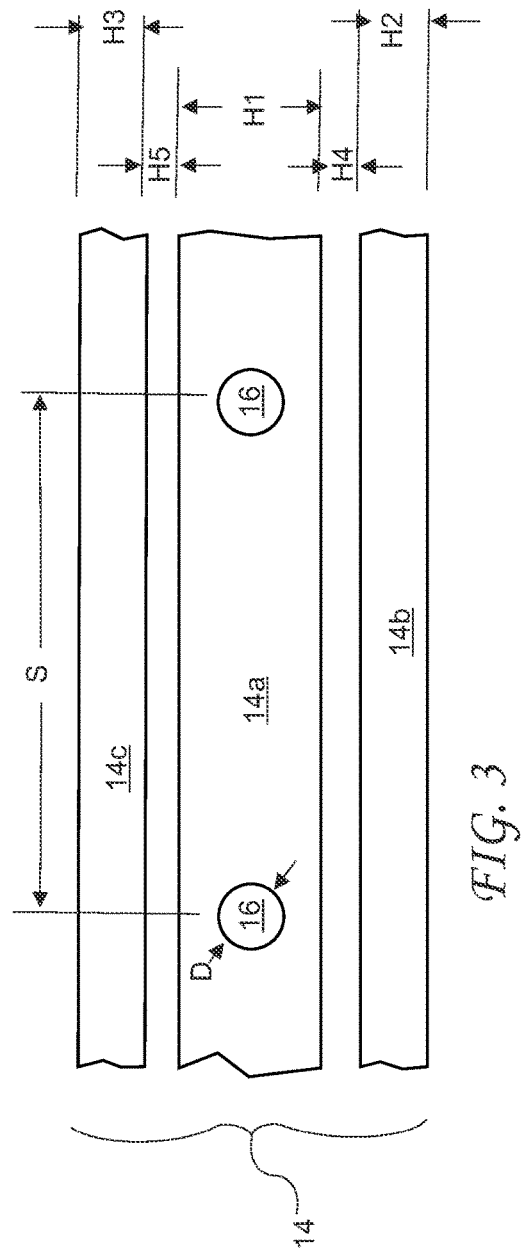
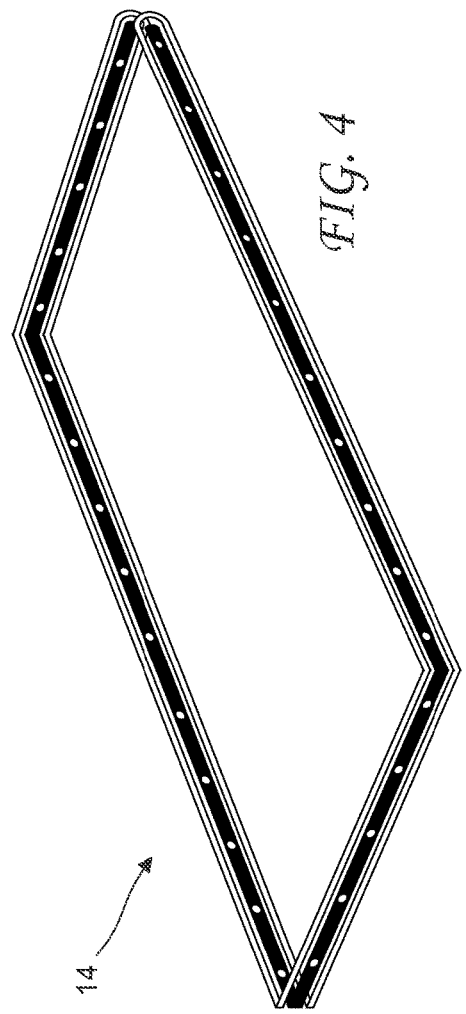
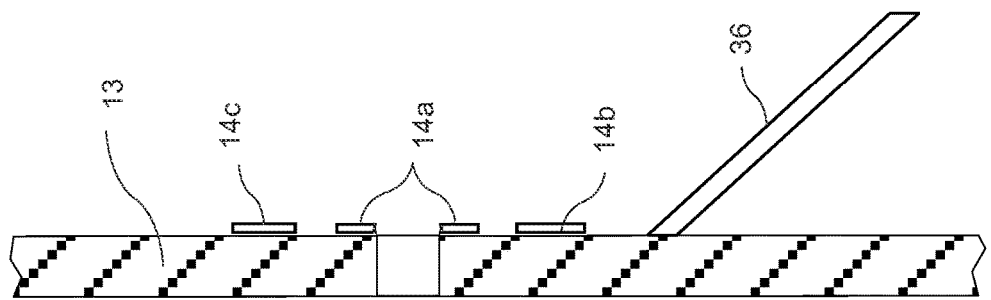

COCKROACH ELECTROCUTION DEVICE

BACKGROUND OF THE INVENTION

The present invention relates to insect control and in particular to German cockroach control.

German cockroaches are attracted by heat and humidity. German cockroaches prefer a temperature of 85° to 95° F. with a humidity of 90 to 95% (although they do quite well at normal room temperatures and humidity also). German cockroaches will be concentrated within a given room where the temperature or humidity is highest, such as above refrigerators and other heat-generating equipment, under the sink, and around water pipes.

German cockroaches are a significant problem in the United States, Canada, and other countries where they tend to infest food preparation establishments, kitchens, and bathrooms. They are small, about one half inch long, are tan to nearly black in color, and have wings but do not fly. The German cockroaches may be difficult to identify because the hide in dark areas, but may be identified by the presence of their fecal matter which looks like pepper/coffee grounds. A significant problem is that German cockroaches reproduce at a very high rate, and adult females can produce from four to eight egg capsules in their lifetime. Each capsule contains 30-48 eggs.

Because German cockroaches have been found to carry Salmonella, which may cause food poisoning, they are a significant problem. German cockroach skins and droppings can also trigger an allergic reaction in people with asthma or other sensitivities. The discovery of German cockroaches in a restaurant may cause health code issues, and a loss of customers.

Known German cockroach traps fail to attract, kill, and store dead cockroaches. As a result there is a need for a better German cockroach trap.

BRIEF SUMMARY OF THE INVENTION

The present invention addresses the above and other needs by providing a German cockroach trap which provides bait, humidity, and temperature to attract German cockroaches into entries, electrocutes the German cockroaches upon entry into the trap, and stores dead cockroaches below the entries. Electrode bands form a closed ring on an interior surface and contact with two of the rings immediately kills the German cockroach which drops into a receiving dock below. A center electrode band may include holes for entry into the trap. A water reservoir in the bottom of the trap is heated to generate humid vapor. Heaters in the top of the trap are controlled to maintain temperature and a fan in the top of the trap draws ambient air into the trap to create a humid vapor flow out through the entries. Bait trays contain material further attracting the German cockroaches.

In accordance with one aspect of the invention, there is provided a German cockroach trap including electrode rings at entries into the trap. A first one of the rings is vertically aligned with, or is below, the entries. A second one of the rings is below the first one of the rings. A third one of the rings may be above the first one of the rings. A German cockroach entering the trap contacts at least two of the rings and is electrocuted.

In accordance with another aspect of the invention, there is provided a German cockroach trap including entries through a center one of the electrode rings. A German cockroach entering the trap contacts the center ring and a second ring below or above the center ring and is electrocuted.

In accordance with yet another aspect of the invention, there is provided a German cockroach trap including a downward and inward sloping guide below the electrodes to guide electrocuted German cockroaches to fall into receiving docks below.

In accordance with yet another aspect of the invention, there is provided a German cockroach trap including a heated water reservoir producing water vapor released through the entries to attract the German cockroaches. A fan draws ambient air into the trap creating a warm humid vapor flow out of the entries attracting the German cockroaches to the entries.

In accordance with still another aspect of the invention, there is provided a German cockroach trap including a heat source in a housing top maintaining temperature during cold weather.

In accordance with another aspect of the invention, there is provided a German cockroach trap including a bait trays containing baits attracting the German cockroaches.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a side view of a German cockroach trap according to the present invention.

FIG. 1B is an end view of the German cockroach trap according to the present invention.

FIG. 1C is a top view of the German cockroach trap according to the present invention.

FIG. 2 is a cross-sectional view of electrode strips of the German cockroach trap according to the present invention taken along line 2-2 of FIG. 1A.

FIG. 3 is a detailed view of the electrode strips of the German cockroach trap according to the present invention.

FIG. 4 is an isometric view of the electrode strips of the German cockroach trap according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

A side view of a German cockroach trap 10 according to the present invention is shown in FIG. 1A, an end view of the German cockroach trap 10 is shown in FIG. 1B, and a top view of the German cockroach trap 10 is shown in FIG. 1C. The trap 10 includes a housing 12 containing electrodes 14 to electrocute German cockroaches entering the trap through horizontally spaced apart entries 16. The electrodes 14 reside vertically spaced apart, extending horizontally, on an interior surface 13a of the housing walls 13 of the housing 12. At least one of the electrodes 14 is below the entries 16, and preferably another of the electrode is above the entries 16, so that German cockroaches entering through the entries 16, and moving down or up inside the housing 12, are electrocuted. The entries 16 extend along at least a portion of the housing 12, and may extend around the entire perimeter of the housing 12, and the electrodes 14 reside below and also preferably above all of the entries 16. The housing 12 includes a housing bottom portion 12a, a housing center portion 12b, and a housing top portion 12c. A door 30 allows access to a housing interior 12e of the housing 12.

A reservoir 18 in the housing bottom portion 12a of the housing 12 contains a liquid 20, for example water. A submerged heater 22 resides in the reservoir 18 heating the liquid 20 to produce vapor 24 escaping through vapor passages 25 into a housing center portion 12b. Bait trays 32 in the housing center portion 12b may contain bait material providing an odor which attracts the German cockroaches. Receiving docks 34 reside under the entries 16 to collect dead German cockroaches. Heaters 26 in housing walls 13 in the housing top portion 12c heat the housing interior 12e. The heaters 26 are preferable 50 to 100-watt ceramic heaters and may be two heaters 26 controlled separately by switches 42a and 42b allowing more heat during cold weather and less heat during warm weather. A fan 28 is preferably a 5 VDC fan and preferably resides in a housing top 12d. The fan 28 draws an airflow 38a into the housing 12 to cause a second flow 38b of air out of the housing 12 through the entries 16 to attract the German cockroaches.

A cross-sectional view of the electrode strips 14 of the German cockroach trap 10 taken along line 2-2 of FIG. 1A is shown in FIG. 2, a detailed view of the electrode strips 14 is shown in FIG. 3, and an isometric view of the electrode strips 14 is shown in FIG. 4. The electrode strips 14 are preferably comprise a center electrode strip 14a, a lower electrode strip 14b, and optionally an upper electrode strip 14c. The electrode strips 14 are electrically connected to a circuit 40 in the German cockroach trap 10 (see FIGS. 1A and 1C). The circuit 40 preferably receives power from a common wall outlet, for example 120 or 220 VAC, and converts the power to about 3,000 VDC. The positive and negative signals on adjacent ones of the electrode strips 14. A diagonally in and down guide 36 reaches in from the housing wall 13 under the entries 16 to guide electrocuted German cockroaches into the receiving docks 34.

The entries 16 are preferably a diameter D and spaced apart a spacing S and are through the center electrode strip 14a having a height H1. The lower electrode strip 14b has a height H2 and is separated from the center electrode strip 14a by a height H4. The upper electrode strip 14c has a height H3 and is separated from the center electrode strip 14a by a height H5. The diameter D is preferably about 5 mm and more preferably is 5 mm. The spacing S is preferably about 40 mm and more preferably is 40 mm. The height H1 is preferably about 11 mm and more preferably is 11 mm. The heights H2 and H3 are preferably about 5 mm and more preferably is 5 mm. The heights H4 and H5 are preferably about 3 mm and more preferably are 3 mm.

While the invention herein disclosed has been described by means of specific embodiments and applications thereof, numerous modifications and variations could be made thereto by those skilled in the art without departing from the scope of the invention set forth in the claims.

I claim:

1. A German cockroach electrocution device, comprising:
   a housing having:
      a housing bottom portion;
      a housing center portion;
      a housing top portion;
      a housing top;
      a housing interior; and
      housing walls;
   entries through the housing walls; and
   at least two electrode strips on interior surfaces of the housing walls, a first electrode strip vertically aligned with the entries or below the entries, and a second electrode strip below the first electrode strip.

2. The device of claim 1, further including a third electrode strip above the entries.

3. The device of claim 1, wherein the entries comprise a multiplicity of horizontally spaced apart entries in the housing walls in the housing center portion.

4. The device of claim 1, wherein:
   the entries are spaced horizontally apart around the entire perimeter of the housing in the housing center portion; and
   the electrode strips extend around the entire perimeter of the housing interior on an inside surface of the housing walls.

5. The device of claim 4, wherein all of the entries are at the same height.

6. The device of claim 5, wherein the first electrode strip is vertically centered at the same height as the entries.

7. The device of claim 6, wherein the entries are through the first electrode strip.

8. The device of claim 7, wherein a third electrode strip resides on the inside surface of the housing walls above the first electrode strip.

9. The device of claim 7, further including:
   a reservoir in the housing bottom portion;
   a submerged heater residing in the reservoir; and
   vapor passages between the reservoir and the housing center portion.

10. The device of claim 9, further including at least one heater in the housing top portion.

11. The device of claim 9, further including two heaters in the housing top portion, separate control of each of the two heaters.

12. The device of claim 9, further including a fan in the housing top drawing outside air into the housing top portion and housing center portion and creating an air flow out of the entries.

13. The device of claim 7, wherein:
   the first electrode strip is about 11 mm high;
   the entries are about 5 mm in diameter; and
   the entries are spaced apart horizontally about 40 mm.

14. The device of claim 13, wherein:
   the second electrode strip is about 7 mm high;
   the second electrode strip is about 3 mm below the first electrode strip.

15. The device of claim 7, further including diagonally in and down guides reaches in from the housing walls under the entries.

16. A German cockroach electrocution device, comprising:
   a housing having:
      a housing bottom portion;
      a housing center portion;
      a housing top portion;
      a housing top; and
      housing walls;

entries through the housing walls in the housing center portion and spaced horizontally apart about 40 mm around the entire perimeter of the housing;

a center electrode strip on the housing interior wall around the entire interior perimeter of the housing, the center electrode strip about 11 mm high, the entries through the center electrode strip; and a lower electrode strip on the housing interior wall around the entire interior perimeter of the housing about 3 mm below the center electrode strip, the lower electrode strip about 7 mm high.

17. A German cockroach electrocution device, comprising:
    a housing having:
        a housing bottom portion;
        a housing center portion;
        a housing top portion;
        a housing top; and
        housing walls;
    entries through the housing walls in the housing center portion having a diameter of about 5 mm and spaced horizontally apart about 40 mm around the entire perimeter of the housing;

a center electrode strip on the housing interior wall around the entire interior perimeter of the housing, the center electrode strip about 11 mm high, the entries through the center electrode strip;

a lower electrode strip on the housing interior wall around the entire interior perimeter of the housing about 3 mm below the center electrode strip, the lower electrode strip about 7 mm high;

diagonally in and down guides reaches in from the housing wall under the lower electrode strip;

a reservoir in the housing bottom portion;

a submerged heater residing in the reservoir;

vapor passages between the reservoir and the housing center portion;

at least one heater in the housing top portion;

a fan in the housing top drawing outside air into the housing top portion and housing center portion and creating an air flow out of the entries.

* * * * *